United States Patent
Wu et al.

(10) Patent No.: US 10,009,870 B2
(45) Date of Patent: Jun. 26, 2018

(54) METHOD FOR REPORTING LOCATION INFORMATION OF USER EQUIPMENT, AND APPARATUS

(71) Applicant: Huawei Technologies Co., Ltd., Shenzhen (CN)

(72) Inventors: Yizhuang Wu, Beijing (CN); Wanqiang Zhang, Munich (DE); Xiaoyan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/421,516

(22) Filed: Feb. 1, 2017

(65) Prior Publication Data
US 2017/0142683 A1    May 18, 2017

Related U.S. Application Data

(63) Continuation of application No. PCT/CN2014/083880, filed on Aug. 7, 2014.

(51) Int. Cl.
*H04W 24/00* (2009.01)
*H04W 64/00* (2009.01)
*H04W 4/02* (2018.01)
*H04W 88/02* (2009.01)

(52) U.S. Cl.
CPC ......... *H04W 64/003* (2013.01); *H04W 4/023* (2013.01); *H04W 88/02* (2013.01)

(58) Field of Classification Search
CPC .... H04W 64/003; H04W 4/023; H04W 88/02
See application file for complete search history.

(56) References Cited

U.S. PATENT DOCUMENTS

| 2009/0254494 A1 | 10/2009 | Li et al. | |
| 2013/0279406 A1* | 10/2013 | Merino Vazquez | H04M 15/66 370/328 |
| 2014/0011514 A1* | 1/2014 | Gu | H04W 4/02 455/456.1 |

(Continued)

FOREIGN PATENT DOCUMENTS

| CN | 1756431 A | 4/2006 |
| CN | 101272274 A | 9/2008 |

(Continued)

OTHER PUBLICATIONS

U.S. Appl. No. 62/022692, filed Jul. 2014, Xu, Jian.*

(Continued)

*Primary Examiner* — Wayne H Cai
(74) *Attorney, Agent, or Firm* — Slater Matsil, LLP

(57) ABSTRACT

Embodiments provide a method for reporting location information of user equipment, and an apparatus. A master access node is provided, including an obtaining module, configured to obtain location information of user equipment, where the location information of the user equipment includes serving cell information of at least one secondary access node of the user equipment. The master access node also includes a sending module, configured to send the location information of the user equipment to a core network node, where the location information is used by the core network node to determine a control policy for the user equipment according to the location information of the user equipment.

18 Claims, 4 Drawing Sheets

```
A master access node obtains location information of user
equipment, where the location information of the user equipment    S701
includes serving cell information of at least one secondary access
node of the user equipment

↓

The master access node sends the location information of the
user equipment to a core network node, where the location          S702
information is used by the core network node to determine a
control policy for the user equipment according to the location
information of the user equipment
```

(56) References Cited

U.S. PATENT DOCUMENTS

| | | | | |
|---|---|---|---|---|
| 2014/0038614 A1* | 2/2014 | Diachina | ............... | H04W 36/14 |
| | | | | 455/437 |
| 2015/0139085 A1* | 5/2015 | Kaczmarska-Wojtania | ............... | H04L 5/0053 |
| | | | | 370/329 |
| 2015/0140965 A1* | 5/2015 | Qiang | ................ | H04L 12/1407 |
| | | | | 455/410 |

FOREIGN PATENT DOCUMENTS

| | | |
|---|---|---|
| CN | 101453722 A | 6/2009 |
| CN | 102088780 A | 6/2011 |
| CN | 103533663 A | 1/2014 |

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 12)," 3GPP TS 23.401, V12.5.0, Jun. 2014, 305 pages.

Huawei, "Consideration on SGW Relocation", 3GPP TSG RAN WG3 Meeting #84, R3-141072, Agenda Item 20.1.7, Seoul, Korea, May 19-23, 2014, 3 pages.

* cited by examiner

METHOD FOR REPORTING LOCATION INFORMATION OF USER EQUIPMENT, AND APPARATUS

CROSS-REFERENCE TO RELATED APPLICATIONS

This application is a continuation of International Application No. PCT/CN2014/083880, filed on Aug. 7, 2014, the disclosure of which is hereby incorporated by reference in its entirety.

TECHNICAL FIELD

Embodiments relate to the field of wireless communications technologies, and in particular, to a method for reporting location information of user equipment, and an apparatus.

BACKGROUND

With development of a long term evolution (LTE) system, a multiple stream aggregation (MSA) solution is introduced. In the MSA solution, multiple evolved NodeBs (eNBs) may simultaneously provide services for one user equipment (UE), one eNB is a master evolved NodeB (MeNB), and other eNBs are secondary evolved NodeBs (SeNB).

In the MSA solution, the UE establishes a control plane connection with only the MeNB serving the UE. Likewise, only the MeNB establishes a control plane connection with core network nodes such as a mobility management entity (MME), a serving gateway (S-GW), and a packet data network gateway (P-GW).

Each core network node such as a policy control and charging rules function (PCRF) in a network executes a corresponding control policy for the UE according to location information of the UE, and the location information of the UE is obtained based on information about a serving cell in which the UE is located, and is reported to the core network node by an eNB of the serving cell by means of signaling. In the MSA solution, because only the MeNB establishes the control plane connection with the core network node, the core network node receives only serving cell information of the MeNB that is reported by the MeNB. Therefore, the location information of the UE is obtained based on the serving cell information of the MeNB.

In a current method for reporting a location information of UE, a core network node can receive only serving cell information of an MeNB. Therefore, a granularity of obtained location information of the UE is not fine enough, and a granularity for the UE control is not fine enough either.

SUMMARY

Embodiments provide a method for reporting location information of user equipment, and an apparatus, so as to implement control with a finer granularity over user equipment.

According to a first aspect, a master access node includes an obtaining module, configured to obtain location information of user equipment, where the location information of the user equipment includes serving cell information of at least one secondary access node of the user equipment. The master access node also includes a sending module, configured to send the location information of the user equipment to a core network node, where the location information is used by the core network node to determine a control policy for the user equipment.

With reference to the first aspect, in a first possible implementation manner of the first aspect, the sending module is further configured to send the location information of the user equipment to the core network node by means of control plane signaling.

With reference to the first possible implementation manner of the first aspect, in a second possible implementation manner of the first aspect, the serving cell information of the at least one secondary access node of the user equipment includes: any one or more of identification information of a serving cell of the at least one secondary access node of the user equipment, bearer information corresponding to a serving cell of the at least one secondary access node of the user equipment, a tracking area identity of a serving cell of the at least one secondary access node of the user equipment, or an access network type of a serving cell of the at least one secondary access node of the user equipment; and the sending module is further configured to send the location information of the user equipment to the core network node by using a radio access bearer modification instruction message.

With reference to the first possible implementation manner of the first aspect, in a third possible implementation manner of the first aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and the sending module is further configured to send the location information of the user equipment to the core network node by using a location information update message.

With reference to the first aspect, in a fourth possible implementation manner of the first aspect, the sending module is further configured to: send the location information of the user equipment to the core network node by using a first general packet radio service (GPRS) tunneling protocol user plane (GTP-U) packet, where the location information of the user equipment is in an extension header of the first GTP-U packet; or send the location information of the user equipment to the core network node by using a second GTP-U packet, where the second GTP-U packet is used to send only the location information of the user equipment.

With reference to the fourth possible implementation manner of the first aspect, in a fifth possible implementation manner of the first aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

With reference to any possible implementation manner of the first aspect, or the first to the fifth possible implementation manners of the first aspect, in a sixth possible implementation manner of the first aspect, the control policy for the user equipment includes: any one or more of a charging control policy for the user equipment, a rate control policy for the user equipment, a quality of service control policy for the user equipment, or a priority control policy for the user equipment.

According to a second aspect, a core network node is provided, including a receiving module, configured to receive location information of user equipment that is sent by a master access node, where the location information of the user equipment includes serving cell information of at least one secondary access node of the user equipment. The core network node also includes a processing module, configured to determine a control policy for the user equipment according to the location information of the user equipment.

With reference to the second aspect, in a first possible implementation manner of the second aspect, the receiving module is further configured to receive the location information of the user equipment that is sent by the master access node by means of control plane signaling.

With reference to the first possible implementation manner of the second aspect, in a second possible implementation manner of the second aspect, the serving cell information of the at least one secondary access node of the user equipment includes: any one or more of identification information of a serving cell of the at least one secondary access node of the user equipment, a tracking area identity of a serving cell of the at least one secondary access node of the user equipment, bearer information corresponding to a serving cell of the at least one secondary access node of the user equipment, or an access network type of a serving cell of the at least one secondary access node of the user equipment; and the receiving module is further configured to receive the location information of the user equipment that is sent by the master access node by using a radio access bearer modification instruction message.

With reference to the first possible implementation manner of the second aspect, in a third possible implementation manner of the second aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and the receiving module is further configured to receive the location information of the user equipment that is sent by the master access node by using a location information update message.

With reference to the second aspect, in a fourth possible implementation manner of the second aspect, the receiving module is further configured to: receive the location information of the user equipment that is sent by the master access node by using a first GTP-U packet, where the location information of the user equipment is in an extension header of the first GTP-U packet; or receive the location information of the user equipment that is sent by the master access node by using a second GTP-U packet, where the second GTP-U packet is used to send only the location information of the user equipment.

With reference to the fourth possible implementation manner of the second aspect, in a fifth possible implementation manner of the second aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

With reference to any possible implementation manner of the second aspect, or the first to the fifth possible implementation manners of the second aspect, in a sixth possible implementation manner of the second aspect, the control policy for the user equipment includes: any one or more of a charging control policy for the user equipment, a rate control policy for the user equipment, a quality of service control policy for the user equipment, or a priority control policy for the user equipment.

According to a third aspect, a secondary access node is provided, including: an obtaining module, configured to obtain serving cell information of the secondary access node of user equipment; and a sending module, configured to: send the serving cell information of the secondary access node of the user equipment to a core network node by using a first GTP-U packet, where the serving cell information of the secondary access node of the user equipment is in an extension header of the first GTP-U packet; or send the serving cell information of the secondary access node of the user equipment to a core network node by using a second GTP-U packet, where the second GTP-U packet is used to send only the serving cell information of the secondary access node of the user equipment, and the serving cell information of the secondary access node is used by the core network node to determine a control policy for the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

With reference to the third aspect, in a first possible implementation manner of the third aspect, the control policy for the user equipment includes: any one or more of a charging control policy for the user equipment, a rate control policy for the user equipment, a quality of service control policy for the user equipment, or a priority control policy for the user equipment.

According to a fourth aspect, a core network node is provided, including: a receiving module, configured to: receive serving cell information of a secondary access node of user equipment that is sent by the secondary access node by using a first GTP-U packet, where the serving cell information of the secondary access node of the user equipment is in an extension header of the first GTP-U packet; or receive serving cell information of a secondary access node of user equipment that is sent by the secondary access node by using a second GTP-U packet, where the second GTP-U packet is used to send only the serving cell information of the secondary access node of the user equipment; and a processing module, configured to: after serving cell information of at least one secondary access node of the user equipment is received, determine a control policy for the user equipment according to the serving cell information of the at least one secondary access node of the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

With reference to the fourth aspect, in a first possible implementation manner of the fourth aspect, the control policy for the user equipment includes: any one or more of a charging control policy for the user equipment, a rate control policy for the user equipment, a quality of service control policy for the user equipment, or a priority control policy for the user equipment.

According to a fifth aspect, a method for reporting location information of user equipment is provided, including: obtaining, by a master access node, location information of user equipment, where the location information of the user equipment includes serving cell information of at least one secondary access node of the user equipment; and sending, by the master access node, the location information of the user equipment to a core network node, where the location information is used by the core network node to determine a control policy for the user equipment.

With reference to the fifth aspect, in a first possible implementation manner of the fifth aspect, the sending, by the master access node, the location information of the user equipment to a core network node includes: sending, by the master access node, the location information of the user equipment to the core network node by means of control plane signaling.

With reference to the first possible implementation manner of the fifth aspect, in a second possible implementation manner of the fifth aspect, the serving cell information of the at least one secondary access node of the user equipment includes: any one or more of identification information of a serving cell of the at least one secondary access node of the user equipment, bearer information corresponding to a serving cell of the at least one secondary access node of the user equipment, a tracking area identity of a serving cell of the at least one secondary access node of the user equipment, or an access network type of a serving cell of the at least one secondary access node of the user equipment; and the sending, by the master access node, the location information of the user equipment to the core network node by means of control plane signaling includes: sending, by the master access node, the location information of the user equipment to the core network node by using a radio access bearer modification instruction message.

With reference to the first possible implementation manner of the fifth aspect, in a third possible implementation manner of the fifth aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and the sending, by the master access node, the location information of the user equipment to the core network node by means of control plane signaling includes: sending, by the master access node, the location information of the user equipment to the core network node by using a location information update message.

With reference to the fifth aspect, in a fourth possible implementation manner of the fifth aspect, the sending, by the master access node, the location information of the user equipment to a core network node includes: sending, by the master access node, the location information of the user equipment to the core network node by using a first GTP-U packet, where the location information of the user equipment is in an extension header of the first GTP-U packet; or sending, by the master access node, the location information of the user equipment to the core network node by using a second GTP-U packet, where the second GTP-U packet is used to send only the location information of the user equipment.

With reference to the fourth possible implementation manner of the fifth aspect, in a fifth possible implementation manner of the fifth aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

With reference to any possible implementation manner of the fifth aspect, or the first to the fifth possible implementation manners of the fifth aspect, in a sixth possible implementation manner of the fifth aspect, the control policy for the user equipment includes: any one or more of a charging control policy for the user equipment, a rate control policy for the user equipment, a quality of service control policy for the user equipment, or a priority control policy for the user equipment.

According to a sixth aspect, a method for reporting location information of user equipment is provided, including: receiving, by a core network node, location information of user equipment that is sent by a master access node, where the location information of the user equipment includes serving cell information of at least one secondary access node of the user equipment; and determining, by the core network node, a control policy for the user equipment according to the location information of the user equipment.

With reference to the sixth aspect, in a first possible implementation manner of the sixth aspect, the receiving, by a core network node, location information of user equipment that is sent by a master access node includes: receiving, by the core network node, the location information of the user equipment that is sent by the master access node by means of control plane signaling.

With reference to the first possible implementation manner of the sixth aspect, in a second possible implementation manner of the sixth aspect, the serving cell information of the at least one secondary access node of the user equipment includes: any one or more of identification information of a serving cell of the at least one secondary access node of the user equipment, a tracking area identity of a serving cell of the at least one secondary access node of the user equipment, bearer information corresponding to a serving cell of the at least one secondary access node of the user equipment, or an access network type of a serving cell of the at least one secondary access node of the user equipment; and the receiving, by the core network node, the location information of the user equipment that is sent by the master access node by means of control plane signaling includes: receiving, by the core network node, the location information of the user equipment that is sent by the master access node by using a radio access bearer modification instruction message.

With reference to the first possible implementation manner of the sixth aspect, in a third possible implementation manner of the sixth aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and the receiving, by the core network node, the location information of the user equipment that is sent by the master access node by means of control plane signaling includes: receiving, by the core network node, the location information of the user equipment that is sent by the master access node by using a location information update message.

With reference to the sixth aspect, in a fourth possible implementation manner of the sixth aspect, the receiving, by a core network node, location information of user equipment that is sent by a master access node includes: receiving, by the core network node, the location information of the user equipment that is sent by the master access node by using a first GTP-U packet, where the location information of the user equipment is in an extension header of the first GTP-U packet; or receiving, by the core network node, the location information of the user equipment that is sent by the master access node by using a second GTP-U packet, where the second GTP-U packet is used to send only the location information of the user equipment.

With reference to the fourth possible implementation manner of the sixth aspect, in a fifth possible implementation manner of the sixth aspect, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

With reference to any possible implementation manner of the sixth aspect, or the first to the fifth possible implementation manners of the sixth aspect, in a sixth possible implementation manner of the sixth aspect, the control policy for the user equipment includes: any one or more of a charging control policy for the user equipment, a rate control policy for the user equipment, a quality of service control policy for the user equipment, or a priority control policy for the user equipment.

According to a seventh aspect, a method for reporting location information of user equipment is provided, including: obtaining, by a secondary access node, serving cell information of the secondary access node of user equipment; and sending, by the secondary access node, the serving cell information of the secondary access node of the user equipment to a core network node by using a first GTP-U packet, where the serving cell information of the secondary access node of the user equipment is in an extension header of the first GTP-U packet; or sending, by the secondary access node, the serving cell information of the secondary access node of the user equipment to a core network node by using a second GTP-U packet, where the second GTP-U packet is used to send only the serving cell information of the secondary access node of the user equipment, and the serving cell information of the secondary access node is used by the core network node to determine a control policy for the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

With reference to the seventh aspect, in a first possible implementation manner of the seventh aspect, the control policy for the user equipment includes: any one or more of a charging control policy for the user equipment, a rate control policy for the user equipment, a quality of service control policy for the user equipment, or a priority control policy for the user equipment.

According to an eighth aspect, a method for reporting location information of user equipment is provided, including: receiving, by a core network node, serving cell information of a secondary access node of user equipment that is sent by the secondary access node by using a first GTP-U packet, where the serving cell information of the secondary access node of the user equipment is in an extension header of the first GTP-U packet; or receiving, by a core network node, serving cell information of a secondary access node of user equipment that is sent by the secondary access node by using a second GTP-U packet, where the second GTP-U packet is used to send only the serving cell information of the secondary access node of the user equipment; and after receiving serving cell information of at least one secondary access node of the user equipment, determining, by the core network node, a control policy for the user equipment according to the serving cell information of the at least one secondary access node of the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

With reference to the eighth aspect, in a first possible implementation manner of the eighth aspect, the control policy for the user equipment includes: any one or more of a charging control policy for the user equipment, a rate control policy for the user equipment, a quality of service control policy for the user equipment, or a priority control policy for the user equipment.

According to the method for reporting location information of user equipment, and the apparatus that are provided in the embodiments, an MeNB obtains serving cell information of at least one SeNB of a user equipment (UE), and sends the information to a core network node, so that the core network node can implement control with a finer granularity over the UE.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show some embodiments, and persons of ordinary skill in the art may still derive other drawings from these accompanying drawings without creative efforts.

DETAILED DESCRIPTION OF ILLUSTRATIVE EMBODIMENTS

Figure 1:
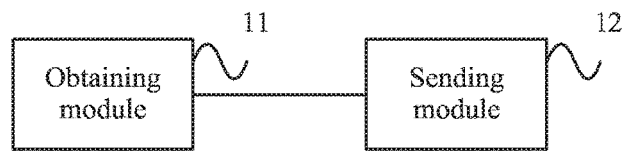
FIG. 1 is a schematic structural diagram of Embodiment 1 of a master access node according to an embodiment.

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

An MSA solution may include a packet-based architecture and a radio access bearer-based (RAB based) architecture, the packet-based architecture is a 3C architecture for short, and the RAB-based architecture is a 1A architecture for short.

In the 3C architecture, UE establishes a control plane connection only with a master evolved eNodeB (MeNB) serving the UE, only a MeNB establishes a control plane connection with a core network node, and only the MeNB establishes a user-plane data connection with the core network node. There is no connection between each secondary evolved eNodeB (SeNB) serving the UE and the core network node, and the SeNB exchanges data with the MeNB. That is, in the 3C architecture, only the MeNB performs signaling and data exchange with the core network node, and both data sent by the SeNB to a core network and data sent from the core network to the SeNB need to be forwarded by the MeNB.

In the 1A architecture, a user equipment (UE) establishes a control plane connection only with an MeNB serving the UE, only an MeNB establishes a control plane connection with a core network node, and there is a user-plane data connection between the core network node and each of the MeNB and the SeNB. However, one service is transmitted on only one MeNB or SeNB.

A system architecture evolution system is used as an example. In the 3C architecture, signaling exchange is performed only between an MeNB and a mobility management entity (MME), and data exchange is performed only between an MeNB and a serving gateway (S-GW). In the 1A architecture, signaling exchange is performed only between an MeNB and an MME, but data exchange is performed between an S-GW and each of an MeNB and an SeNB.

Location information of UE in a network is obtained based on serving cell information of an eNB serving the UE, and location information of the UE may be transmitted to a core network node in an attach procedure, a tracking area update (TAU), a routing area update (RAU) procedure, or a service request procedure. In the MSA solution, only the MeNB establishes the control plane connection with the core network node in both the 3C architecture and the 1A architecture, and the location information of the UE is transmitted to the core network node by means of signaling in each procedure. Therefore, the core network node can receive only serving cell information of the MeNB that is sent by the MeNB. That is, in the MSA solution, the location information of the UE is obtained based on the serving cell information of the MeNB serving the UE.

However, in the MSA solution, one MeNB and one or more SeNBs simultaneously provide services for the UE. Therefore, that only the serving cell information of the MeNB is reported to the core network node makes the location information of the UE not accurate enough. An operator providing a network service may perform control such as charging control, rate control, and priority control on the UE according to the location information of the UE. Therefore, if the location information of the UE is not accurate enough, control with a finer granularity cannot be performed on the UE.

It should be noted that a method for reporting location information of user equipment, and an apparatus that are provided in the present embodiments are applicable not only to the system architecture evolution (SAE) system, but also to another network communications system such as a Universal Mobile Telecommunications System (UMTS). A difference is that different communications systems have different network architectures, but in the communications systems, the method provided in the embodiments may be used to report the location information of the user equipment. In the following embodiments, the SAE system architecture is used as an example to describe the method for reporting location information of user equipment provided in the present embodiments.

In addition, in the embodiments, the MeNB and the SeNB may be separately an access node in any form. For example, the MeNB and the SeNB are respectively a macro eNB and a pico eNB in a same system, or both the MeNB and the SeNB are a macro eNB in a same system, or the MeNB and the SeNB are access point (AP) on an eNB and in a wireless local area network (WLAN) respectively. The MeNB and the SeNB only need to simultaneously provide services for the UE.

FIG. 1 is a schematic structural diagram of Embodiment 1 of a master access node according to an embodiment. As shown in FIG. 1, the master access node in this embodiment includes: an obtaining module 11 and a sending module 12.

The obtaining module 11 is configured to obtain location information of user equipment, where the location information of the user equipment includes serving cell information of at least one secondary access node of the user equipment.

Specifically, the MeNB provided in this embodiment is configured to report the location information of the UE to a core network node, the MeNB provides a service for the UE, and the at least one SeNB also provides a service for the UE.

The location information of the UE reflects a location of the UE, and generally, a coverage area of a serving cell of an MeNB is larger than a coverage area of a serving cell of an SeNB. Therefore, if the core network node obtains serving cell information of an SeNB serving the UE, a more accurate location of the UE is obtained. In this way, in comparison with a case in which only serving cell information of the MeNB is reported to the core network node, when the serving cell information of the SeNB serving the UE is also reported to the core network node, the core network node obtains location information of the UE with a finer granularity.

Therefore, the MeNB provided in this embodiment includes the obtaining module 11, and the obtaining module 11 is configured to obtain the location information of the UE, where the location information of the UE includes the serving cell information of the at least one SeNB of the UE. The serving cell information of the SeNB may be any information that can represent a feature of the SeNB. The obtaining module 11 may obtain the serving cell information of the SeNB by means of data exchange between the MeNB and the SeNB, or the obtaining module 11 may obtain the serving cell information of the SeNB by using information reported by the UE to the MeNB.

The sending module 12 is configured to send the location information of the user equipment to a core network node, where the location information is used by the core network node to determine a control policy for the user equipment.

Specifically, after the obtaining module 11 obtains location information of the UE, the sending module 12 sends the location information to the core network node. An SAE system is used as an example. The core network node includes an MME, an S-GW, a packet gateway (P-GW), a policy control and charging rules function (PCRF), and the like, the MME establishes a control plane connection with the MeNB, and the S-GW establishes a user-plane data connection with the MeNB. The sending module 12 may send the location information of the UE to the MME or the S-GW, the MME or the S-GW sends the location information of the UE to the PCRF by using the P-GW, and the PCRF configures different charging or control policies for the UE according to different location information of the UE, and sends the configured charging or control policies to an execution entity such as a policy and charging enforcement function (PCEF) entity or a bearer binding and event report function (BBERF), so as to perform corresponding control on the UE.

Because the location information of the UE includes the serving cell information of the at least one SeNB of the UE, the core network node may obtain a more accurate location of the UE according to the location information, so as to formulate a control policy with a finer granularity for the UE. Because there is the control plane connection and the user-plane data connection between the MeNB and the core network node, the sending module 12 may send the location information of the UE to the core network node by means of control plane signaling, or the sending module 12 may send the location information of the UE to the core network node by using a user plane packet.

In this embodiment, an MeNB obtains serving cell information of at least one SeNB of UE, and sends the information to a core network node, so that the core network node can implement control with a finer granularity over the UE.

For two architectures in an MSA solution, the master access node shown in FIG. 1 performs different specific processing methods, which are described in detail in the following.

In a 1A architecture, the MeNB and the SeNB separately establish a user-plane data connection with the core network node, that is, the MeNB and the SeNB separately establish a bearer with the core network node. Therefore, when the SeNB needs to provide a service for the UE, the sending module 12 in the MeNB may send a radio access bearer modification instruction message to the core network node, and the radio access bearer modification instruction message includes the location information of the UE. In this way, the location information of the UE may be sent to the core network node without a need of changing an existing signaling procedure. In this case, the serving cell information of the at least one SeNB of the UE includes: any one or more of identification information of a serving cell of the at least one SeNB of the UE, bearer information corresponding to a serving cell of the at least one SeNB of the UE, a tracking area identity of a serving cell of the at least one SeNB of the UE, or an access network type of a serving cell of the at least one SeNB of the UE.

Figure 2:
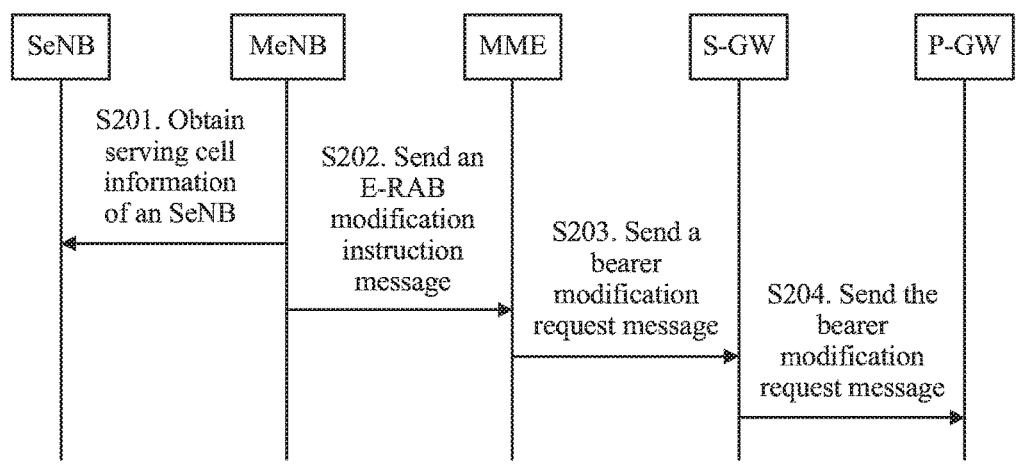
FIG. 2 is a signaling flowchart of reporting location information by using a bearer modification procedure in a system architecture evolution (SAE) system.

The SAE system is used as an example to describe the foregoing processing of the MeNB. FIG. 2 is a signaling flowchart of reporting location information by using a bearer modification procedure in an SAE system. As shown in FIG. 2, an MME, an S-GW, a P-GW, and a PCRF in the SAE system are collectively referred to as a core network node.

When an SeNB in a network starts to serve UE, an MeNB needs to notify the SeNB of related information such as network configuration, and in step S201, the MeNB may obtain serving cell information of the SeNB. The serving cell information of the SeNB may be any information that can represent a serving cell that is of the SeNB and that serves the UE, for example, any one or more of identification information of the serving cell of the SeNB, bearer information corresponding to the serving cell of the SeNB, a tracking area identity of the serving cell of the SeNB, or an access network type of the serving cell of the SeNB.

The SeNB is newly added to serve the UE, bearer information of the UE changes, the SeNB needs to establish a bearer with each node in a core network, and there is no control plane connection between the SeNB and the MME. Therefore, in step S202, the MeNB needs to send an evolved packet system RAB (E-RAB) modification instruction message to the MME, to instruct the MME to modify the bearer information of the UE. The E-RAB modification instruction message carries location information of the UE. In this embodiment, only one MeNB and only one SeNB serve the UE, and serving cell information of the MeNB may be sent to the MME when the MeNB establishes a bearer with each node in the core network. Therefore, in this embodiment, the location information of the UE may include only the serving cell information of the SeNB, or the location information of the UE may include both the serving cell information of the MeNB and the serving cell information of the SeNB.

After receiving the E-RAB modification instruction message, in step S203, the MME sends a bearer modification request message including the location information of the UE to the S-GW. In step S204, the S-GW sends, as required, the bearer modification request message including the location information of the UE to the P-GW. After receiving the location information of the UE, the P-GW sends the location information of the UE to the PCRF as required, and the PCRF determines a control policy for the UE according to the location information of the UE. A correspondence between the location information of the UE and the control policy for the UE may be preset in the PCRF, and after receiving the location information of the UE, the PCRF may determine the control policy for the UE. Alternatively, a rule for setting the control policy for the UE may be preset in the PCRF, and after receiving the location information of the UE, the PCRF may determine the control policy for the UE according to the preset rule. The control policy for the UE may include any one or more of a charging control policy for the UE, a rate control policy for the UE, a quality of service control policy for the UE, or a priority control policy for the UE. That is, the PCRF may formulate different control policies for the UE according to the location information of the UE, so as to control the UE from multiple aspects. After determining the control policy for the UE, the PCRF sends the control policy to a corresponding execution entity such as a PCEF or a BBERF, and each execution entity performs corresponding control on the UE according to the control policy sent by the PCRF.

It should be noted that, if at least two SeNBs simultaneously provide services for the UE, the MeNB only needs to send serving cell information of any one or more SeNBs to the core network node, or the MeNB may send serving cell information of all SeNBs of the UE to the core network node.

In a 3C architecture, because only the MeNB establishes a control plane connection and a user-plane data connection with the core network node, when the SeNB needs to provide a service for the UE, the sending module 12 in the MeNB also needs to report the location information of the UE to the core network node. However, because there is no bearer between the SeNB and the core network node, the sending module 12 cannot send the location information of the UE to the core network node by using a radio access bearer modification instruction message. A new control plane message may be defined herein, which is referred to as a location information update message. The location information update message is used to send the location information of the UE to the core network node when the location information of the UE changes. In this case, the serving cell information of the at least one SeNB of the UE includes: any one or more of identification information of a serving cell of the at least one SeNB of the UE, a quantity of data packets or data packets transmitted in a serving cell of the at least one SeNB of the UE, a tracking area identity of a serving cell of the at least one SeNB of the UE, or an access network type of a serving cell of the at least one SeNB of the UE. Alternatively, the serving cell information of the at least one SeNB of the UE includes multi-stream indication information, where the multi-stream indication information is used to indicate that at least two access nodes provide services for the UE.

Figure 3:
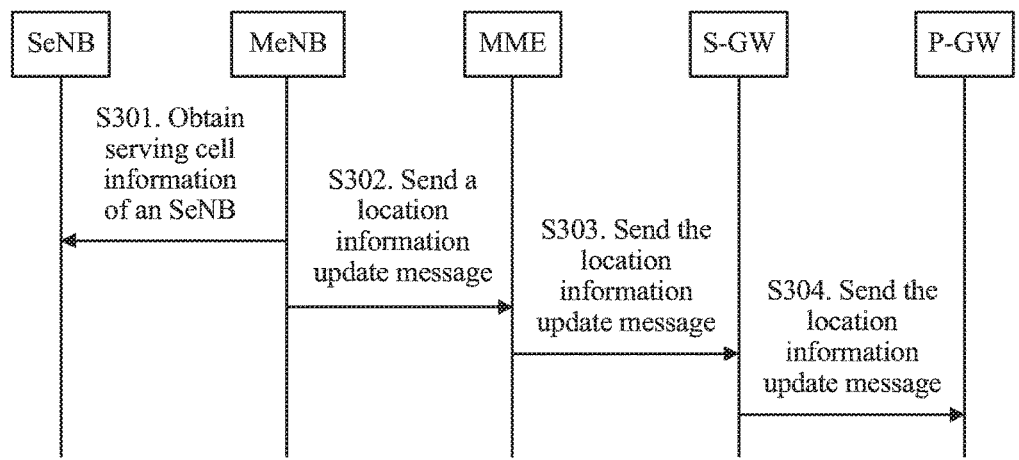
FIG. 3 is a signaling flowchart of reporting location information by using a location information update procedure in an SAE system.

The SAE system is used as an example. In the 3C architecture, a signaling procedure for location information reporting is similar to that of FIG. 2, and a difference is only that the E-RAB modification instruction message is changed into the location information update message. FIG. 3 is a signaling flowchart of reporting location information by using a location information update procedure in an SAE system. As shown in FIG. 3, an MME, an S-GW, a P-GW, and a PCRF in the SAE system are collectively referred to as a core network node.

When an SeNB in a network starts to serve UE, an MeNB provides data forwarding for the SeNB, all data packets or data packets sent and received by the SeNB need to be forwarded by the MeNB, and in step S301, the MeNB may obtain serving cell information of the SeNB. The serving cell information of the SeNB may be any information that can represent a serving cell that is of the SeNB and that serves the UE, for example, any one or more of identification information of the serving cell of the SeNB, a quantity of data packets or data packets transmitted in the serving cell of the SeNB, a tracking area identity of the serving cell of the SeNB, or an access network type of the serving cell of the SeNB. Alternatively, the serving cell information of the SeNB may include multi-stream indication information. A difference between the embodiments shown in FIG. 3 and FIG. 2 is that the serving cell information of the SeNB of the UE in FIG. 2 includes the bearer information corresponding to the serving cell of the SeNB, but the serving cell information of the SeNB of the UE in FIG. 3 includes the quantity of data packets or data packets transmitted in the serving cell of the SeNB. This is because the SeNB establishes a bearer with the core network node in FIG. 2, and the MeNB may obtain the serving cell information of the SeNB; but there is no bearer between the SeNB and the core network node in FIG. 3, all data packets or data packets of the SeNB need to be forwarded by the MeNB, and the MeNB may obtain only the quantity of data packets or data packets transmitted in the serving cell of the SeNB. In addition, the multi-stream indication information indicates that at least two access nodes provide services for the UE, that is, when the MeNB learns that at least one SeNB also serves the UE, the MeNB may determine that the at least two access nodes provide the services for the UE.

In step S302, the MeNB needs to send a location information update message to the MME, and send the location information of the UE to the MME, and the location information update message is used to send only the location information of the UE to the MME. In this embodiment, only one MeNB and only one SeNB serve the UE, and serving cell information of the MeNB may be sent to the MME when the MeNB establishes a bearer with each node in a core network. Therefore, in this embodiment, the location information of the UE may include only the serving cell information of the SeNB, or the location information of the UE may include both the serving cell information of the MeNB and the serving cell information of the SeNB.

After receiving the location information update message, in step S303, the MME sends the location information update message including the location information of the UE to the S-GW. In step S304, the S-GW sends, as required, the location information update message including the location information of the UE to the P-GW. After receiving the location information of the UE, the P-GW sends the location information of the UE to the PCRF as required, and the PCRF determines a control policy for the UE according to the location information of the UE. A correspondence between the location information of the UE and the control policy for the UE may be preset in the PCRF, and after receiving the location information of the UE, the PCRF may determine the control policy for the UE. Alternatively, a rule for setting the control policy for the UE may be preset in the PCRF, and after receiving the location information of the UE, the PCRF may determine the control policy for the UE according to the preset rule. The control policy for the UE may include any one or more of a charging control policy for the UE, a rate control policy for the UE, a quality of service control policy for the UE, or a priority control policy for the UE. That is, the PCRF may formulate different control policies for the UE according to the location information of the UE, so as to control the UE from multiple aspects. After determining the control policy for the UE, the PCRF sends the control policy to a corresponding execution entity such as a PCEF or a BBERF, and each execution entity performs corresponding control on the UE according to the control policy sent by the PCRF.

In addition, after receiving the location information update message, the P-GW may further send a reception confirmation message to the S-GW, and after receiving the reception confirmation message, the S-GW may further send the reception confirmation message to the MME.

It should be noted that, if at least two SeNBs simultaneously provide services for the UE, the MeNB only needs to send serving cell information of any one or more SeNBs to the core network node, or the MeNB may send serving cell information of all SeNBs of the UE to the core network node.

Another specific method for reporting location information of UE is in a 3C architecture. In the 3C architecture, because only the MeNB establishes a control plane connection and a user-plane data connection with the core network node, when the SeNB needs to provide a service for the UE, the sending module 12 in the MeNB also needs to report the location information of the UE to the core network node. However, the sending module 12 does not send the location information of the UE to the core network node by using a signaling message herein, but sends the location information of the UE to the core network node by using a user-plane data packet. In this case, the serving cell information of the at least one SeNB of the UE includes: any one or more of identification information of a serving cell of the at least one SeNB of the UE, a quantity of data packets or data packets transmitted in a serving cell of the at least one SeNB of the UE, a tracking area identity of a serving cell of the at least one SeNB of the UE, or an access network type of a serving cell of the at least one SeNB of the UE.

The SAE system is used as an example, and the MME, the S-GW, the P-GW, and the PCRF in the SAE system are collectively referred to as the core network node. In the 3C architecture, a first general packet radio service (GPRS) tunneling protocol-user plane (GTP-U) packet sent by the MeNB to the S-GW includes the location information of the UE, where the location information of the UE may be in an extension header of the first GTP-U packet; or, a second GTP-U packet sent by the MeNB to the S-GW includes the location information of the UE, where the second GTP-U packet is a newly-added packet, and the packet is used to send only the location information of the user equipment. A specific method for obtaining location information of UE by an MeNB is the same as that of step S301. After receiving the location information of the UE by using a GTP-U packet, the S-GW sends the location information of the UE to the P-GW, the P-GW may further send the location information of the UE to the PCRF, and the PCRF may determine the control policy for the UE according to the location information of the UE. Exchange processes between the S-GW, the P-GW, and the PCRF are similar to those of FIG. 2 and of FIG. 3. Details are not described herein.

Figure 4:
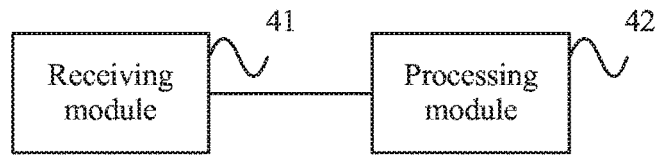
FIG. 4 is a schematic structural diagram of Embodiment 1 of a core network node according to an embodiment.

FIG. 4 is a schematic structural diagram of Embodiment 1 of a core network node according to an embodiment. As shown in FIG. 4, the core network node in this embodiment includes: a receiving module 41 and a processing module 42.

The receiving module 41 is configured to receive location information of user equipment that is sent by a master access node, where the location information of the user equipment includes serving cell information of at least one secondary access node of the user equipment.

Specifically, all nodes in a core network are collectively referred to as the core network node in this embodiment. For example, for an SAE system, the core network node includes an MME, an S-GW, a P-GW, a PCRF, and the like. The core network node includes the receiving module 41, and the receiving module 41 may be disposed on any core network node as long as the receiving module 41 can receive the location information of the UE that is sent by the MeNB.

The MeNB in this embodiment provides a service for the UE, and the at least one SeNB also provides a service for the UE. The location information of the UE reflects a location of the UE, and generally, a coverage area of a serving cell of an MeNB is larger than a coverage area of a serving cell of an SeNB. Therefore, if the core network node obtains serving cell information of an SeNB serving the UE, a more accurate location of the UE is obtained. In this way, in comparison with a case in which serving cell information of the MeNB is reported to the core network node, when the serving cell information of the SeNB serving the UE is reported to the core network node, the core network node obtains location information of the UE with a finer granularity.

Therefore, the core network node provided in this embodiment includes the receiving module 41, the receiving module 41 is configured to receive the location information of the user equipment that is sent by the MeNB, and the location information of the UE includes the serving cell information of the at least one SeNB of the UE. The serving cell information of the SeNB may be any information that can represent a feature of the SeNB.

Because there is a control plane connection and a user-plane data connection between the MeNB and the core network node, the receiving module 41 may receive the location information of the UE that is sent by the MeNB by means of control plane signaling, or the receiving module 41 may receive the location information of the UE that is sent by the MeNB by using a user plane packet.

The processing module 42 is configured to determine a control policy for the user equipment according to the location information of the user equipment.

Specifically, the core network node provided in this embodiment further includes the processing module 42, and the processing module 42 is configured to determine the control policy for the UE according to the location information of the UE. Because the location information of the UE includes the serving cell information of the at least one SeNB of the UE, the processing module 42 may obtain a more accurate location of the UE according to the location information, so as to formulate a control policy with a finer granularity for the UE.

The processing module 42 may be disposed on any node that is in the core network node and that can determine the control policy for the UE, for example, the PCRF in the SAE system. The PCRF configures different charging or control policies for the UE according to different location information of the UE, and sends the configured charging or control policies to an execution entity such as a PCEF or a BBERF, so as to perform corresponding control on the UE.

In this embodiment, an MeNB obtains serving cell information of at least one SeNB of UE, and sends the information to a core network node, so that the core network node can implement control with a finer granularity over the UE.

For two architectures in the MSA solution, the core network node shown in FIG. 4 performs different specific processing methods, which are described in detail in the following.

In a 1A architecture, the MeNB and the SeNB separately establish a user-plane data connection with the core network node, that is, the MeNB and the SeNB separately establish a bearer with the core network node. When the SeNB needs to provide a service for the UE, the receiving module 41 in the core network node may receive a radio access bearer modification instruction message sent by the MeNB, and the radio access bearer modification instruction message includes the location information of the UE. In this way, the location information of the UE that is sent by the MeNB may be received without a need of changing an existing signaling procedure. In this case, the serving cell information of the at least one SeNB of the UE includes: any one or more of identification information of a serving cell of the at least one SeNB of the UE, bearer information corresponding to a serving cell of the at least one SeNB of the UE, a tracking area identity of a serving cell of the at least one SeNB of the UE, or an access network type of a serving cell of the at least one SeNB of the UE.

The SAE system is used as an example, and the MME, the S-GW, the P-GW, and the PCRF in the SAE system are collectively referred to as the core network node. The receiving module 41 is disposed in the MME, and the processing module 42 is disposed in the PCRF. For a specific method for reporting location information of UE, refer to FIG. 2.

In a 3C architecture, because only the MeNB establishes a control plane connection and a user-plane data connection with the core network node, when the SeNB needs to provide a service for the UE, the receiving module 41 in the core network node also needs to receive the location information of the UE that is reported by the MeNB. However, because there is no bearer between the SeNB and the core network node, in this case, the receiving module 41 cannot receive, by using the radio access bearer modification instruction message, the location information of the UE that is sent by the MeNB. A new control plane message may be defined herein, which is referred to as a location information update message. The location information update message is used to send the location information of the UE to the core network node when the location information of the UE changes. In this case, the serving cell information of the at least one SeNB of the UE includes: any one or more of identification information of a serving cell of the at least one SeNB of the UE, a quantity of data packets or data packets transmitted in a serving cell of the at least one SeNB of the UE, a tracking area identity of a serving cell of the at least one SeNB of the UE, or an access network type of a serving cell of the at least one SeNB of the UE. Alternatively, the serving cell information of the at least one SeNB of the UE includes multi-stream indication information, where the multi-stream indication information is used to indicate that at least two access nodes provide services for the UE.

The SAE system is used as an example, and the MME, the S-GW, the P-GW, and the PCRF in the SAE system are collectively referred to as the core network node. The receiving module 41 is disposed in the S-GW, and the processing module 42 is disposed in the PCRF. For a specific method for reporting location information of UE, refer to FIG. 3.

Another specific method for reporting location information of UE is in a 3C architecture. In the 3C architecture, because only the MeNB establishes a control plane connection and a user-plane data connection with the core network node, when the SeNB needs to provide a service for the UE, the receiving module 41 on the core network node may receive, by using a user-plane data packet, the location information of the UE that is sent by the MeNB. In this case, the serving cell information of the at least one SeNB of the UE includes: any one or more of identification information of a serving cell of the at least one SeNB of the UE, a quantity of data packets or data packets transmitted in a serving cell of the at least one SeNB of the UE, a tracking area identity of a serving cell of the at least one SeNB of the UE, or an access network type of a serving cell of the at least one SeNB of the UE.

The SAE system is used as an example, and the MME, the S-GW, the P-GW, and the PCRF in the SAE system are collectively referred to as the core network node. The receiving module 41 is disposed in the S-GW, and the processing module 42 is disposed in the PCRF. A first GTP-U packet sent by the MeNB includes the location information of the UE, where the location information of the UE may be in an extension header of the first GTP-U packet; or, a second GTP-U packet sent by the MeNB includes the location information of the UE, where the second GTP-U packet is a newly-added packet, and the packet is used to send only the location information of the user equipment.

Figure 5:
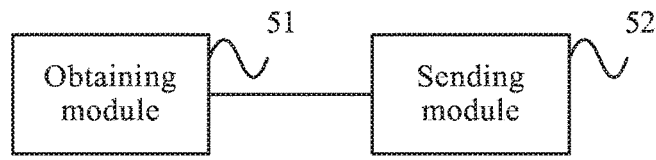
FIG. 5 is a schematic structural diagram of Embodiment 1 of a secondary access node according to an embodiment.

FIG. 5 is a schematic structural diagram of Embodiment 1 of a secondary access node according to an embodiment. As shown in FIG. 5, the secondary access node in this embodiment includes: an obtaining module 51 and a sending module 52.

The obtaining module 51 is configured to obtain serving cell information of the SeNB of the UE.

Specifically, the SeNB provided in this embodiment is applied to a 1A architecture. In the 1A architecture, an MeNB and the SeNB separately establish a user-plane data connection with a core network node, that is, the MeNB and the SeNB separately establish a bearer with the core network node. Therefore, both the MeNB and the SeNB may send a data packet to the core network node. In this way, the core network node may obtain the serving cell information of the SeNB by using the data packet sent by the SeNB.

The location information of the UE reflects a location of the UE, and generally, a coverage area of a serving cell of an MeNB is larger than a coverage area of a serving cell of an SeNB. Therefore, if the core network node obtains serving cell information of an SeNB serving the UE, a more accurate location of the UE is obtained. In this way, in comparison with a case in which serving cell information of the MeNB is reported to the core network node, when the serving cell information of the SeNB serving the UE is reported to the core network node, the core network node obtains location information of the UE with a finer granularity.

The SeNB includes the obtaining module 51, and the obtaining module 51 is configured to obtain the serving cell information of the SeNB of the UE. The serving cell information of the SeNB may be any information that can represent a feature of the SeNB. The serving cell information of the SeNB of the UE includes: any one or more of identification information of a serving cell of the SeNB of the UE, bearer information corresponding to a serving cell of the SeNB of the UE, a tracking area identity of a serving cell of the SeNB of the UE, or an access network type of a serving cell of the SeNB of the UE.

The sending module 52 is configured to: send the serving cell information of the SeNB of the UE to a core network node by using a first GTP-U packet, where the serving cell information of the SeNB of the UE is in an extension header of the first GTP-U packet; or send the serving cell information of the SeNB of the UE to a core network node by using a second GTP-U packet, where the second GTP-U packet is used to send only the serving cell information of the SeNB of the UE, and the serving cell information of the SeNB is used by the core network node to: after the core network node receives serving cell information of at least one SeNB of the UE, determine a control policy for the UE according to the serving cell information of the at least one SeNB of the UE.

Specifically, after the obtaining module 51 obtains the serving cell information of the SeNB of the UE, the sending module 52 sends the serving cell information to the core network node. An SAE system is used as an example, and the core network node includes an MME, an S-GW, a P-GW, a PCRF, and the like. The S-GW establishes a user-plane data connection with the SeNB, the sending module 52 may send the serving cell information of the SeNB of the UE to the S-GW by using the first GTP-U packet, and the S-GW sends the serving cell information of the SeNB of the UE to the PCRF by using the P-GW. The serving cell information of the SeNB of the UE is in the extension header of the first GTP-U. Alternatively, the sending module 52 may send the serving cell information of the SeNB of the UE to the S-GW by using the second GTP-U packet, where the second GTP-U packet is a newly-added packet, and the second GTP-U packet is used to send only the serving cell information of the SeNB of the UE. After receiving serving cell information sent by the at least one SeNB in a network, the PCRF may determine a location of the UE, configure different charging or control policies for the UE according to the location, and send the configured charging or control policies to an execution entity such as a policy and charging enforcement function (PCEF) entity or a bearer binding and event report function (BBERF), so as to perform corresponding control on the UE.

Because the core network node determines the location of the UE after receiving the serving cell information of the at least one SeNB of the UE, the core network node may obtain a more accurate location of the UE according to the location information, so that the core network node may formulate a control policy with a finer granularity for the UE.

In this embodiment, an SeNB sends serving cell information of the SeNB of UE to a core network node by using a GTP-U packet, so that the core network node can implement control with a finer granularity over the UE.

Further, in the embodiment shown in FIG. 5, the control policy for the UE includes: any one or more of a charging control policy for the UE, a rate control policy for the UE, a quality of service control policy for the UE, or a priority control policy for the UE.

Figure 6:
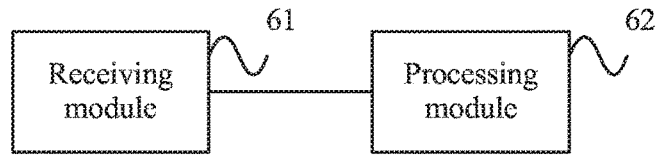
FIG. 6 is a schematic structural diagram of Embodiment 2 of a core network node according to an embodiment.

FIG. 6 is a schematic structural diagram of Embodiment 2 of a core network node according to an embodiment. As shown in FIG. 6, the core network node in this embodiment includes: a receiving module 61 and a processing module 62.

The receiving module 61 is configured to: receive serving cell information of an SeNB of user equipment that is sent by the SeNB by using a first GTP-U packet, where the serving cell information of the SeNB of the UE is in an extension header of the first GTP-U packet; or receive serving cell information of an SeNB of UE that is sent by the SeNB by using a second GTP-U packet, where the second GTP-U packet is used to send only the serving cell information of the SeNB of the UE.

Specifically, all nodes in a core network are collectively referred to as the core network node in this embodiment. For example, for an SAE system, the core network node includes an MME, an S-GW, a P-GW, a PCRF, and the like. The core network node includes the receiving module 61, and the receiving module 61 may be disposed on any core network node as long as the receiving module 61 can receive the serving cell information of the SeNB that is sent by the SeNB by using a GTP-U packet. In the SAE system, the receiving module 61 is disposed in the S-GW.

The serving cell information of the SeNB of the UE reflects a location of the UE, and generally, a coverage area of a serving cell of an MeNB is larger than a coverage area of a serving cell of an SeNB. Therefore, if the core network node obtains serving cell information of an SeNB serving the UE, a more accurate location of the UE is obtained. In this way, in comparison with a case in which serving cell information of the MeNB is reported to the core network node, when the serving cell information of the SeNB serving the UE is reported to the core network node, the core network node obtains location information of the UE with a finer granularity.

Therefore, the core network node provided in this embodiment includes the receiving module 61, the receiving module 61 is configured to receive the serving cell information of the SeNB that is sent by the SeNB, and the serving cell information of the SeNB may be any information that can represent a feature of the SeNB.

The receiving module 61 receives the serving cell information of the SeNB of the user equipment that is sent by the SeNB by using the first GTP-U packet, where the serving cell information of the SeNB of the UE is in the extension header of the first GTP-U. Alternatively, the receiving module 61 receives the serving cell information of the SeNB of the UE that is sent by the SeNB by using the second GTP-U packet, where the second GTP-U packet is a newly-added packet, and the second GTP-U packet is used to send only the serving cell information of the SeNB of the UE.

The processing module 62 is configured to: after serving cell information of at least one SeNB of the UE is received, determine a control policy for the UE according to the serving cell information of the at least one SeNB of the UE.

Specifically, the core network node provided in this embodiment further includes the processing module 62, and the processing module 62 is configured to: after the serving cell information of the at least one SeNB of the UE is received, determine the control policy for the UE. Because the receiving module 61 receives the serving cell information of the at least one SeNB of the UE, the processing module 62 may obtain a more accurate location of the UE according to a serving cell information of the at least one SeNB of the UE, so as to formulate a control policy with a finer granularity for the UE.

The processing module 62 may be disposed on any node that is in the core network node and that can determine the control policy for the UE, for example, the PCRF in the SAE system. The PCRF configures different charging or control policies for the UE according to different location information of the UE, and sends the configured charging or control policies to an execution entity such as a PCEF or a BBERF, so as to perform corresponding control on the UE.

In this embodiment, an SeNB sends serving cell information of the SeNB of UE to a core network node by using a GTP-U packet, so that the core network node can implement control with a finer granularity over the UE.

Further, in the embodiment shown in FIG. 6, the control policy for the UE includes: any one or more of a charging control policy for the UE, a rate control policy for the UE, a quality of service control policy for the UE, or a priority control policy for the UE.

Figure 7:
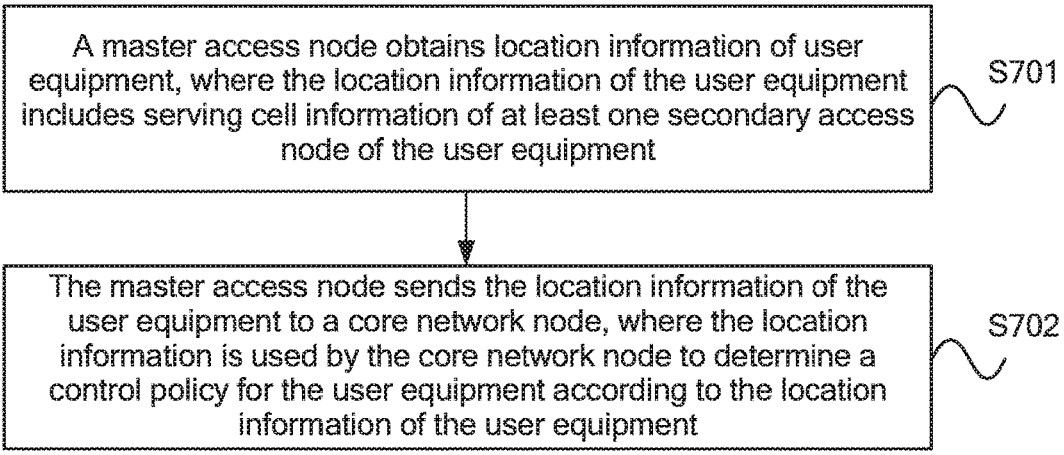
FIG. 7 is a flowchart of Embodiment 1 of a method for reporting location information of user equipment according to an embodiment.

FIG. 7 is a flowchart of Embodiment 1 of a method for reporting location information of user equipment according to an embodiment. As shown in FIG. 7, the method in this embodiment includes the following steps.

Step S701. A master access node obtains location information of user equipment, where the location information of the user equipment includes serving cell information of at least one secondary access node of the user equipment.

Step S702. The master access node sends the location information of the user equipment to a core network node, where the location information is used by the core network node to determine a control policy for the user equipment.

The method for reporting location information of user equipment in this embodiment is used to complete processing of the master access node shown in FIG. 1, and implementation principles and technical effects thereof are similar. Details are not described herein.

Further, in the embodiment shown in FIG. 7, step S702 includes: the master access node sends the location information of the user equipment to the core network node by means of control plane signaling.

Further, in the embodiment shown in FIG. 7, the serving cell information of the at least one secondary access node of the user equipment includes: any one or more of identification information of a serving cell of the at least one secondary access node of the user equipment, bearer information corresponding to a serving cell of the at least one secondary access node of the user equipment, a tracking area identity of a serving cell of the at least one secondary access node of the user equipment, or an access network type of a serving cell of the at least one secondary access node of the user equipment; and step S702 includes: the master access node sends the location information of the user equipment to the core network node by using a radio access bearer modification instruction message.

Further, in the embodiment shown in FIG. 7, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and step S702 includes: the master access node sends the location information of the user equipment to the core network node by using a location information update message.

Further, in the embodiment shown in FIG. 7, step S702 includes: the master access node sends the location information of the user equipment to the core network node by using a first GTP-U packet, where the location information of the user equipment is in an extension header of the first GTP-U packet; or the master access node sends the location information of the user equipment to the core network node by using a second GTP-U packet, where the second GTP-U packet is used to send only the location information of the user equipment. The serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

Further, in the embodiment shown in FIG. 7, the control policy for the user equipment includes: any one or more of a charging control policy for the user equipment, a rate control policy for the user equipment, a quality of service control policy for the user equipment, or a priority control policy for the user equipment.

Figure 8:
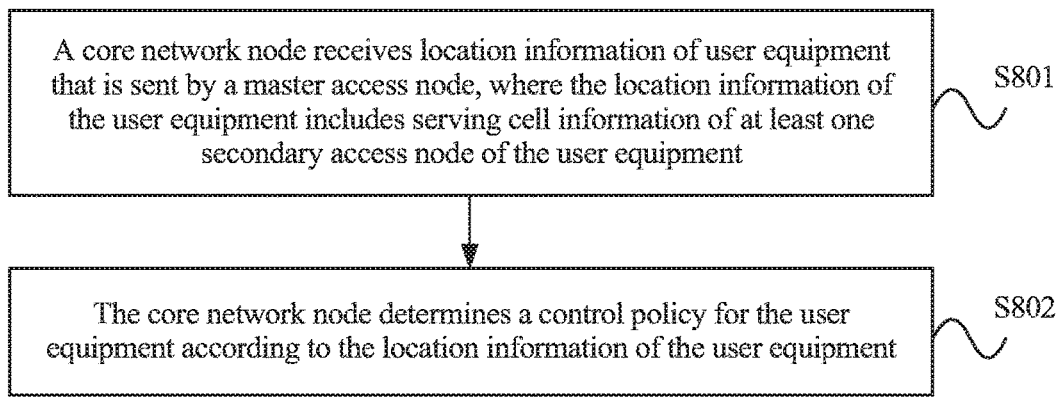
FIG. 8 is a flowchart of Embodiment 2 of a method for reporting location information of user equipment according to an embodiment.

FIG. 8 is a flowchart of Embodiment 2 of a method for reporting location information of user equipment according to an embodiment. As shown in FIG. 8, the method in this embodiment includes the following steps.

Step S801. A core network node receives location information of user equipment that is sent by a master access node, where the location information of the user equipment includes serving cell information of at least one secondary access node of the user equipment.

Step S802. The core network node determines a control policy for the user equipment according to the location information of the user equipment.

The method for reporting location information of user equipment in this embodiment is used to complete processing of the core network node shown in FIG. 4, and implementation principles and technical effects thereof are similar. Details are not described herein.

Further, in the embodiment shown in FIG. 8, step S801 includes: the core network node receives the location information of the user equipment that is sent by the master access node by means of control plane signaling.

Further, in the embodiment shown in FIG. 8, the serving cell information of the at least one secondary access node of the user equipment includes: any one or more of identification information of a serving cell of the at least one secondary access node of the user equipment, a tracking area identity of a serving cell of the at least one secondary access node of the user equipment, bearer information corresponding to a serving cell of the at least one secondary access node of the user equipment, or an access network type of a serving cell of the at least one secondary access node of the user equipment; and step S801 includes: the core network node receives the location information of the user equipment that is sent by the master access node by using a radio access bearer modification instruction message.

Further, in the embodiment shown in FIG. 8, the serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment; or the serving cell information of the at least one secondary access node of the user equipment includes multi-stream indication information, where the multi-stream indication information is used to indicate that at least two access nodes provide services for the user equipment; and step S801 includes: the core network node receives the location information of the user equipment that is sent by the master access node by using a location information update message.

Further, in the embodiment shown in FIG. 8, step S801 includes: the core network node receives the location information of the user equipment that is sent by the master access node by using a first GTP-U packet, where the location information of the user equipment is in an extension header of the first GTP-U packet; or a core network node receives the location information of the user equipment that is sent by the master access node by using a second GTP-U packet, where the second GTP-U packet is used to send only the location information of the user equipment. The serving cell information of the at least one secondary access node of the user equipment includes: any one or more of identification information of a serving cell of the at least one secondary access node of the user equipment, a quantity of data packets or data packets transmitted in a serving cell of the at least one secondary access node of the user equipment, a tracking area identity of a serving cell of the at least one secondary access node of the user equipment, or an access network type of a serving cell of the at least one secondary access node of the user equipment.

Further, in the embodiment shown in FIG. 8, the control policy for the user equipment includes: any one or more of a charging control policy for the user equipment, a rate control policy for the user equipment, a quality of service control policy for the user equipment, or a priority control policy for the user equipment.

Figure 9:
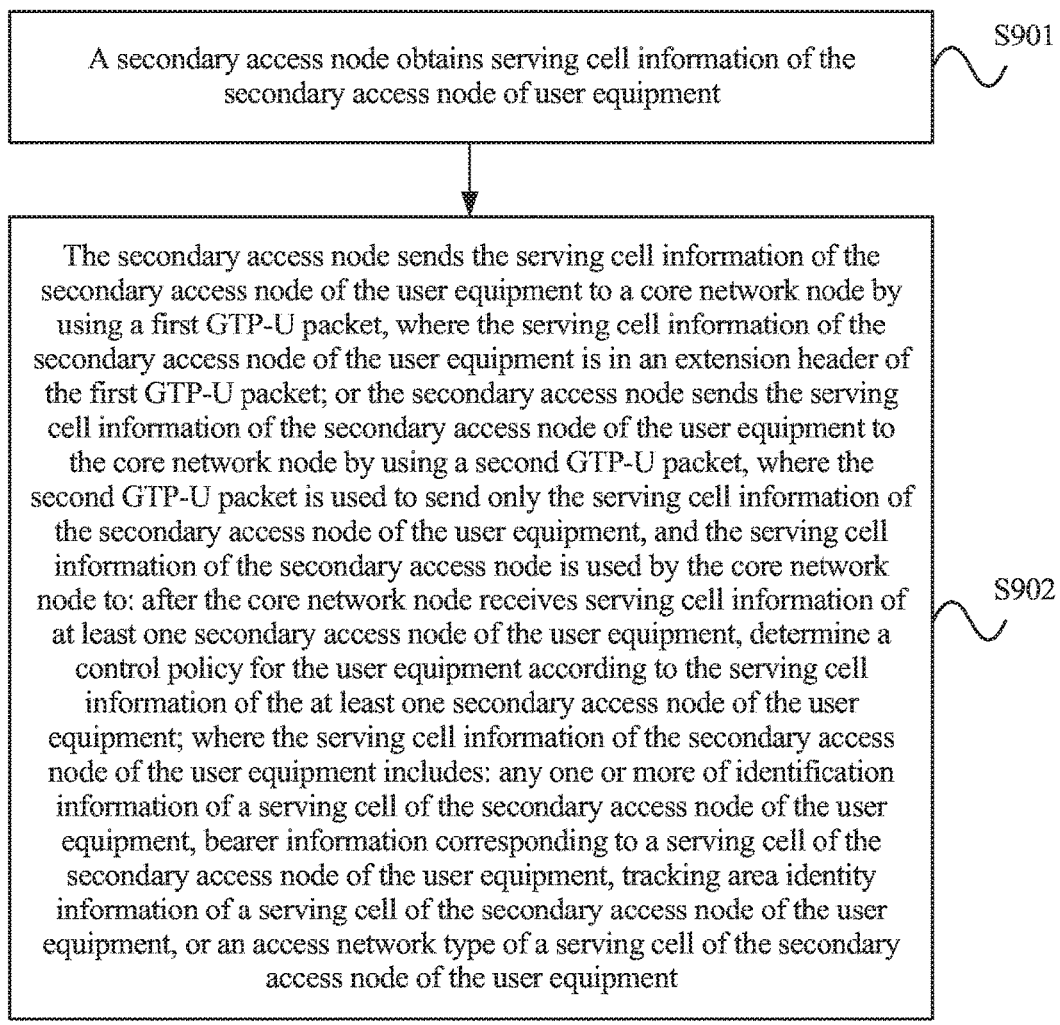
FIG. 9 is a flowchart of Embodiment 3 of a method for reporting location information of user equipment according to an embodiment.

FIG. 9 is a flowchart of Embodiment 3 of a method for reporting location information of user equipment according to an embodiment. As shown in FIG. 9, the method in this embodiment includes the following steps.

Step S901. A secondary access node obtains serving cell information of the secondary access node of user equipment.

Step S902. The secondary access node sends the serving cell information of the secondary access node of the user equipment to a core network node by using a first GTP-U packet, where the serving cell information of the secondary access node of the user equipment is in an extension header of the first GTP-U packet; or the secondary access node sends the serving cell information of the secondary access node of the user equipment to a core network node by using a second GTP-U packet, where the second GTP-U packet is used to send only the serving cell information of the secondary access node of the user equipment, and the serving cell information of the secondary access node is used by the core network node to: after the core network node receives serving cell information of at least one secondary access node of the user equipment, determine a control policy for the user equipment according to the serving cell information of the at least one secondary access node of the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

The method for reporting location information of user equipment in this embodiment is used to complete processing of the secondary access node shown in FIG. 5, and implementation principles and technical effects thereof are similar. Details are not described herein.

Further, in the embodiment shown in FIG. 9, the control policy for the user equipment includes: any one or more of a charging control policy for the user equipment, a rate control policy for the user equipment, a quality of service control policy for the user equipment, or a priority control policy for the user equipment.

Figure 10:
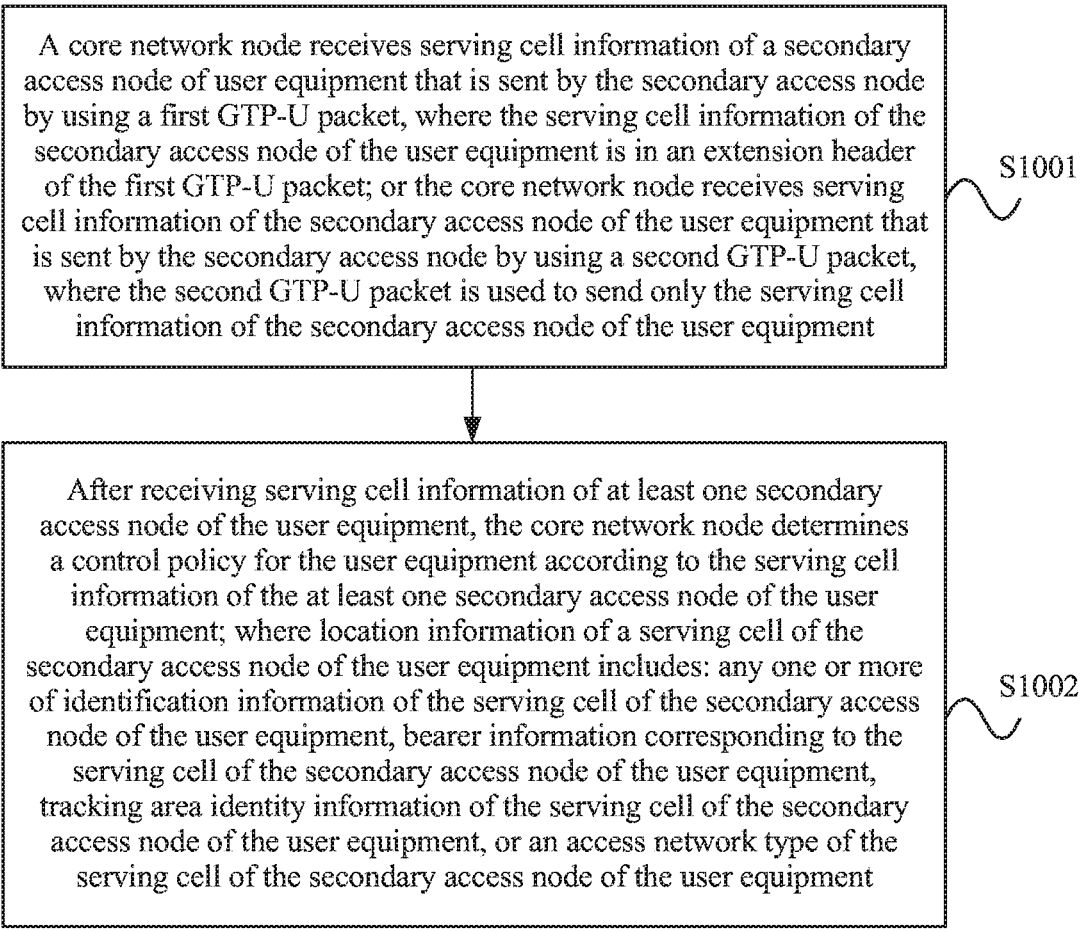
FIG. 10 is a flowchart of Embodiment 4 of a method for reporting location information of user equipment according to an embodiment.

FIG. 10 is a flowchart of Embodiment 4 of a method for reporting location information of user equipment according to an embodiment. As shown in FIG. 10, the method in this embodiment includes the following steps.

Step S1001. A core network node receives serving cell information of a secondary access node of user equipment that is sent by the secondary access node by using a first GTP-U packet, where the serving cell information of the secondary access node of the user equipment is in an extension header of the first GTP-U packet; or a core network node receives serving cell information of a secondary access node of user equipment that is sent by the secondary access node by using a second GTP-U packet, where the second GTP-U packet is used to send only the serving cell information of the secondary access node of the user equipment.

Step S1002. After receiving serving cell information of at least one secondary access node of the user equipment, the core network node determines a control policy for the user equipment according to the serving cell information of the at least one secondary access node of the user equipment; where the serving cell information of the secondary access node of the user equipment includes: any one or more of identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

The method for reporting location information of user equipment in this embodiment is used to complete processing of the core network node shown in FIG. 6, and implementation principles and technical effects thereof are similar. Details are not described herein.

Further, in the embodiment shown in FIG. 10, the control policy for the user equipment includes: any one or more of a charging control policy for the user equipment, a rate control policy for the user equipment, a quality of service control policy for the user equipment, or a priority control policy for the user equipment.

Persons of ordinary skill in the art may understand that all or some of the steps of the method embodiments may be implemented by a program instructing relevant hardware.

The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present embodiments shall be subject to the protection scope of the claims.

What is claimed is:

1. A master access node, comprising:
   a processor; and
   a non-transitory computer readable storage medium storing a program for execution by the processor, the program including instructions to:
      obtain location information of a user equipment using serving cell information of at least one secondary access node of the user equipment, the user equipment being served by the master access node and the at least one secondary access node, and the location information of the user equipment being used for determining a location of the user equipment, wherein the at least one secondary access node of the user equipment lacks ability to establish a control-plane connection with a core network node, and wherein the serving cell information comprises identification information of a serving cell of the at least one secondary access node, bearer information corresponding to a serving cell of the at least one secondary access node of the user equipment, a tracking area identity of a serving cell of the at least one secondary access node of the user equipment, a quantity of data packets transmitted in a serving cell of the at least one secondary access node of the user equipment, multi-stream indication information, or an access network type of a serving cell of the at least one secondary access node of the user equipment; and
      send the location information of the user equipment to the core network node, for the core network node to determine a control policy for the user equipment.

2. The master access node according to claim 1, wherein the instructions to send the location information of the user equipment comprise instructions to send the location information of the user equipment to the core network node using control plane signaling.

3. The master access node according to claim 2, wherein the instructions to send the location information of the user equipment comprise instructions to send the location information of the user equipment to the core network node by using a radio access bearer modification instruction message.

4. The master access node according to claim 2, wherein the instructions to send the location information of the user equipment comprise instructions to send the location information of the user equipment to the core network node by using a location information update message.

5. The master access node according to claim 2, wherein the serving cell information of the at least one secondary access node of the user equipment comprises the multi-stream indication information, wherein the multi-stream indication information indicates that at least two access nodes provide services for the user equipment, and wherein the instructions to send the location information of the user equipment comprise instructions to send the location information of the user equipment to the core network node by a location information update message.

6. The master access node according to claim 1, wherein the instructions to send the location information of the user equipment comprise instructions to:
   send the location information of the user equipment to the core network node by using a first general packet radio service tunneling protocol-user plane (GTP-U) packet or a second GTP-U packet, wherein the location information of the user equipment is in an extension header of the first GTP-U packet, and wherein the second GTP-U packet indicates only the location information of the user equipment.

7. The master access node according to claim 1, wherein the control policy for the user equipment is selected from the group consisting of:
   a charging control policy for the user equipment, a rate control policy for the user equipment, a quality of service control policy for the user equipment, or a priority control policy for the user equipment.

8. A core network node, comprising:
   a processor; and
   a non-transitory computer readable storage medium storing a program for execution by the processor, the program including instructions to:
      receive location information of a user equipment that is sent by a master access node, the user equipment being served by the master access node and at least one secondary access node that lacks ability to establish a control-plane connection with the core network node, wherein the location information of the user equipment is determined based on serving cell information of the at least one secondary access node of the user equipment, and wherein the serving cell information comprises identification information of a serving cell of the at least one secondary access node, bearer information corresponding to a serving cell of the at least one secondary access node of the user equipment, a tracking area identity of a serving cell of the at least one secondary access node of the user equipment, a quantity of data packets transmitted in a serving cell of the at least one secondary access node of the user equipment, multi-stream indication information, or an access network type of a serving cell of the at least one secondary access node of the user equipment; and
      determine a control policy for the user equipment according to the location information of the user equipment.

9. The core network node according to claim 8, wherein the instructions to receive the location information of the user equipment comprise instructions to receive the location information of the user equipment that is sent by the master access node by control plane signaling.

10. The core network node according to claim 9, wherein the instructions to receive the location information of the user equipment comprise instructions to receive the location information of the user equipment that is sent by the master access node by using a radio access bearer modification instruction message.

11. The core network node according to claim 9, wherein the instructions to receive the location information of the user equipment comprise instructions to receive the location information of the user equipment that is sent by the master access node by using a location information update message.

12. The core network node according to claim 9, wherein the serving cell information of the at least one secondary access node of the user equipment comprises the multi-stream indication information, wherein the multi-stream indication information indicates that at least two access nodes provide services for the user equipment, and wherein the instructions to receive the location information of the user equipment comprise instructions to:
receive the location information of the user equipment is sent by the master access node by a location information update message.

13. The core network node according to claim 8, wherein the instructions to receive the location information of the user equipment comprise instructions to:
receive the location information of the user equipment that is sent by the master access node by using a first general packet radio service tunneling protocol-user plane (GTP-U) packet or a second GTP-U packet, wherein the location information of the user equipment is in an extension header of the first GTP-U packet, and wherein the second GTP-U packet indicates only the location information of the user equipment.

14. The core network node according to claim 8, wherein the control policy for the user equipment is selected from the group consisting of:
a charging control policy for the user equipment, a rate control policy for the user equipment, a quality of service control policy for the user equipment, or a priority control policy for the user equipment.

15. A secondary access node, comprising:
a processor; and
a non-transitory computer readable storage medium storing a program for execution by the processor, the program including instructions to:
obtain serving cell information of the secondary access node of a user equipment served by both a master access node and the secondary access node, wherein the secondary access node lacks capability of establishing a control-plane connection with a core network node; and
send the serving cell information of the secondary access node of the user equipment directly to the core network node for the core network node to obtain a location of the user equipment using the serving cell information, wherein the serving cell information is sent using a first general packet radio service tunneling protocol-user plane (GTP-U) packet or a second GTP-U packet, wherein the serving cell information of the secondary access node of the user equipment is in an extension header of the first GTP-U packet, wherein the second GTP-U packet indicates only the serving cell information of the secondary access node of the user equipment, and wherein the serving cell information of the secondary access node of the user equipment is selected from the group consisting of:
identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

16. The secondary access node according to claim 15, wherein a control policy for the user equipment is selected from the group consisting of:
a charging control policy for the user equipment, a rate control policy for the user equipment, a quality of service control policy for the user equipment, or a priority control policy for the user equipment.

17. A core network node, comprising:
a processor; and
a non-transitory computer readable storage medium storing a program for execution by the processor, the program including instructions to:
receive serving cell information of a secondary access node of a user equipment, the serving cell information being sent by the secondary access node directly to the core network node using a first general packet radio service tunneling protocol-user plane (GTP-U) packet or a second GTP-U packet, wherein the serving cell information of the secondary access node of the user equipment is in an extension header of the first GTP-U packet, wherein the second GTP-U packet indicates only the serving cell information of the secondary access node of the user equipment, and wherein the user equipment is served by both a master access node and the secondary access node that lacks a capability of establishing a control-plane connection with the core network node; and
determine a control policy for the user equipment according to the serving cell information of the secondary access node of the user equipment after receiving the serving cell information of the secondary access node, wherein the serving cell information of the secondary access node of the user equipment is selected from the group consisting of:
identification information of a serving cell of the secondary access node of the user equipment, bearer information corresponding to a serving cell of the secondary access node of the user equipment, a tracking area identity of a serving cell of the secondary access node of the user equipment, or an access network type of a serving cell of the secondary access node of the user equipment.

18. The core network node according to claim 17, wherein the control policy for the user equipment is selected from the group consisting of:
a charging control policy for the user equipment, a rate control policy for the user equipment, a quality of service control policy for the user equipment, or a priority control policy for the user equipment.

* * * * *